United States Patent [19]
Duckworth

[11] 4,192,266
[45] Mar. 11, 1980

[54] COOLING SYSTEM FOR INTERNAL COMBUSTION ENGINE

[76] Inventor: Charles E. Duckworth, 1421 SE. 10th St., Deerfield Beach, Fla. 33441

[21] Appl. No.: 920,925

[22] Filed: Jun. 30, 1978

[51] Int. Cl.² ............................................. F02M 31/00
[52] U.S. Cl. .................. 123/119 A; 123/133; 123/122 E
[58] Field of Search ................ 123/119 A, 136, 133, 123/122 E, 122 C, 122 D; 165/52, 51

[56] References Cited
U.S. PATENT DOCUMENTS

| | | | |
|---|---|---|---|
| 1,107,967 | 8/1914 | Knaak | 123/122 C |
| 1,261,734 | 4/1918 | Gifford | 123/122 D |
| 1,443,859 | 1/1923 | Allen | 123/122 D |
| 2,390,979 | 12/1945 | Young | 123/122 E |
| 2,748,758 | 6/1956 | Fairbanks | 123/122 E |
| 3,699,938 | 10/1972 | Frazier | 123/122 E |
| 3,738,334 | 6/1973 | Farr | 123/122 E |
| 4,068,628 | 1/1978 | Duckworth | 123/119 A |

*Primary Examiner*—Ronald H. Lazarus
*Attorney, Agent, or Firm*—C. Lamont Whitham

[57] ABSTRACT

A cooling system for an internal combustion engine is provided with a primary heat exchanger and a secondary or auxiliary heat exchanger. A liquid coolant is used in the engine block, and circulation is achieved using a conventional water pump. However, no fan is required to draw air through a radiator core. Instead, air is conducted through tubing within a reservoir for the liquid coolant, this structure comprising the first heat exchanger. The air for the first heat exchanger is supplied from atmosphere and circulates through the tubing within the reservoir and is then conducted to the intake manifold of the internal combustion engine. The suction caused by the intake manifold vacuum causes air to constantly flow through the tubing in the water reservoir. This has the advantage of not only cooling the water but preheating the air that is supplied to the intake manifold. Moreover, because a fan is not required to draw air through a radiator core, it is possible to locate the first heat exchanger remotely from the internal combustion engine, thereby affording a flexibility in the design of a vehicle which uses the internal combustion engine as its motive power source. The secondary or auxiliary heat exchanger is a flat plate heat exchanger attached to the bottom of the fuel tank which supplies fuel to the internal combustion engine. This heat exchanger is connected in parallel with the primary heat exchanger so that liquid coolant from the engine also circulates in this heat exchanger. The fuel in the fuel tank which has a low vapor pressure serves to cool the liquid coolant by heat transfer from the secondary heat exchanger. The fuel which is vaporized as a result of this heat exchange may be supplied directly to the intake manifold of the engine. In addition to the heat exchange provided by the fuel, several tubes parallel to the direction of airflow pass entirely through the secondary heat exchanger. Air passes through these tubes due to the motion of a vehicle for which the internal combustion engine is the motive power source. Airflow through the tubes may be improved by adding air scoops to the inlet ends. In addition, one or more or all of the tubes can be blocked with caps depending on the ambient temperature.

6 Claims, 6 Drawing Figures

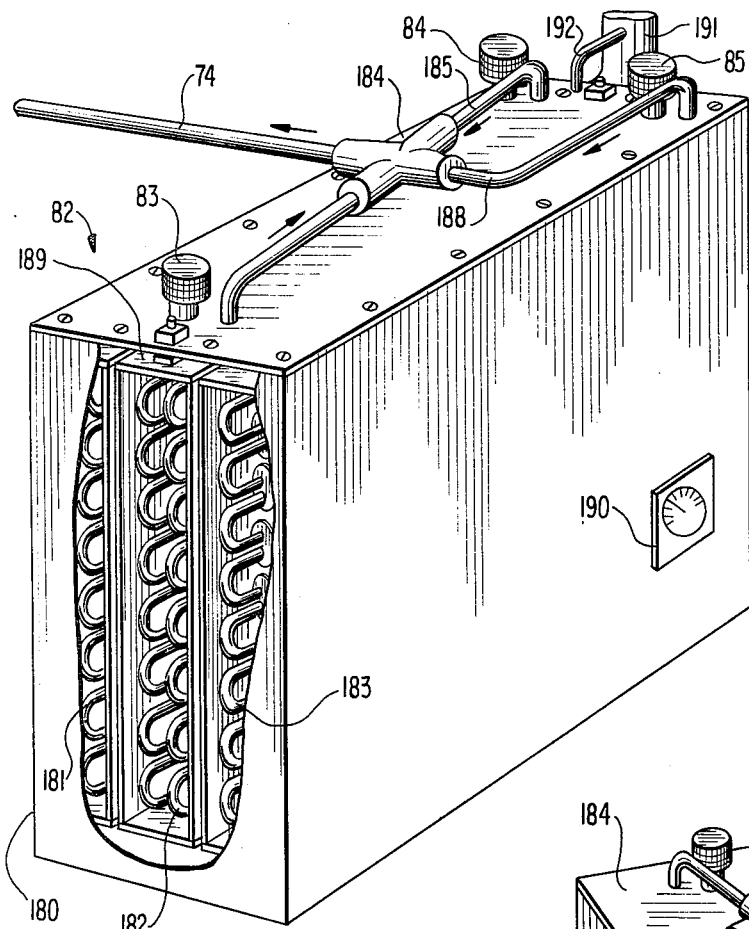
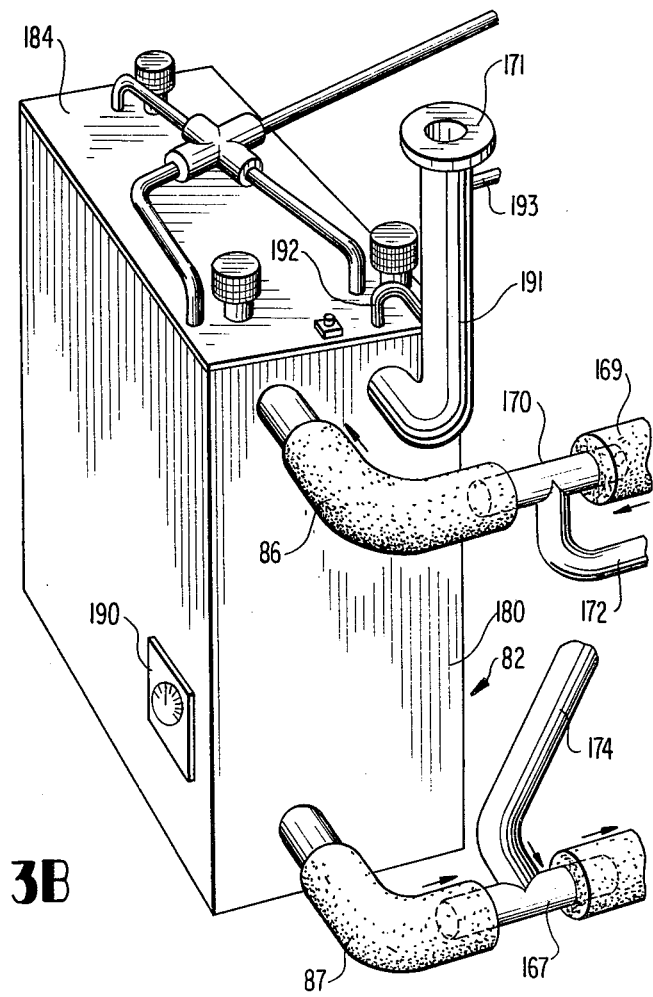
FIG 3A
FIG 3B

COOLING SYSTEM FOR INTERNAL COMBUSTION ENGINE

BACKGROUND OF THE INVENTION

This invention relates generally to cooling systems for internal combustion engines and, more particularly, to a novel arrangement of heat exchangers which eliminates the need for a conventional fan and radiator, thereby affording a substantial degree of flexibility in the design of a vehicle which uses the internal combustion engine as its motive power source.

Cooling systems for internal combustion engines used as the motive power source for automobiles and other such vehicles typically employ a liquid coolant, such as a water and ethylene glycol mixture, which is circulated through the engine block. Circulation of the liquid coolant is achieved using a liquid coolant or water pump typically driven by a belt from a crankshaft pulley. Conventionally, a multi-bladed fan is bolted to the water pump pulley, and this fan is used to draw air through the core of a radiator through which the liquid coolant circulates. In this way, the liquid coolant which has been heated in the engine block is cooled before recirculation to the engine block.

The conventional cooling system, while quite effective and serviceable, has certain disadvantages. These relate to the cooperative relationship and proximate placement of the radiator and fan. The radiator represents a certain amount of weight and bulk volume which must be accommodated in the engine compartment of the automobile. With the advent of the energy crisis, considerable effort is now being devoted to designing and producing smaller, more fuel efficient automobiles. With a reduction in size of the automobile, weight distribution and volume allocation become significant design factors. The fan itself represents a source of lost energy. This, of course, has been recognized by others who have provided such devices as clutches to disengage the fan when the automobile is moving at a substantial velocity, thereby producing a sufficient airflow through the radiator core without the aid of the fan. Nevertheless, the fan is required for low-speed operation, such as city driving, which is the most inefficient operation of the vehicle.

SUMMARY OF THE INVENTION

It is therefore an object of the invention to provide a cooling system for an internal combustion engine which eliminates the need for the conventional radiator and fan. This is accomplished by providing a primary heat exchanger of unique design. This heat exchanger comprises a reservoir for the liquid coolant which is circulated through the engine block, and air is conducted through tubing within the reservoir. This air is supplied from atmosphere, circulates through the tubing within the reservoir and is then conducted to the intake manifold of the internal combustion engine.

The cooling system according to the invention is particularly useful when used with the internal combustion engine disclosed in my U.S. Pat. No. 4,068,628. That patent describes a multi-cylinder internal combustion engine wherein an even number of cylinders are isolated for the purpose of burning the exhaust products of the engine. In the preferred embodiment of this invention, the tubing in the liquid coolant reservoir is connected to the intake manifold for the designated exhaust burning cylinders. The suction supplied by the intake manifold causes a constant flow of air through the tubing in the liquid coolant reservoir. This has the advantage of not only cooling the water but preheating the air that is supplied to the intake manifold.

The invention also contemplates the use of a secondary or auxiliary heat exchanger which is basically in the form of a flat plate tank attached to the fuel tank which supplies the internal combustion engine. While typically having a generally flat configuration, this secondary heat exchanger is preferably constructed so as to conform to the contours of the fuel tank, thereby providing maximum surface contact. The secondary heat exchanger is connected in parallel to the primary heat exchanger so that coolant which is circulated within the engine block also flows through the secondary heat exchanger. The fuel has a low vapor pressure so that heat is readily transferred from the liquid coolant in the secondary heat exchanger to the fuel with the result that fuel is vaporized. The fuel vapors may be conducted directly to the intake manifold for the designated exhaust burning cylinders as described in my U.S. Pat. No. 4,068,628.

To improve the heat exchange capabilities of the secondary heat exchanger, a plurality of tubes are provided parallel to the direction of airflow when the vehicle is in motion, these tubes passing completely through the secondary heat exchanger. Thus, when the vehicle is in motion, air flows through these tubes to improve the heat exchange capacity of the secondary heat exchanger. This airflow may be further enhanced by adding air scoops to the inlets of each of the tubes. Alternatively, the inlets and outlets of one or more or all of the tubes may be capped depending on ambient temperatures.

BRIEF DESCRIPTION OF THE DRAWINGS

The invention will be better understood from the following detailed description of a preferred embodiment given by way of non-limiting example with reference to the accompanying drawings, in which:

FIGS. 3A and 3B are perspective views showing, respectively, air line and liquid coolant connections of the primary heat exchanger.

DESCRIPTION OF THE PREFERRED EMBODIMENT

The preferred embodiment described herein is used in conjunction with a V8 internal combustion engine which has been modified so that two cylinders are designated exhaust burning cylinders as described in my U.S. Pat. No. 4,068,628. It will be understood, however, that the principles of the invention can be readily applied to other automotive internal combustion engines which use a liquid coolant but are not necessarily modified to have designated exhaust burning cylinders. The advantages of using the modified engine having designated exhaust burning cylinders will become apparent from the following discussion.

Figure 1:
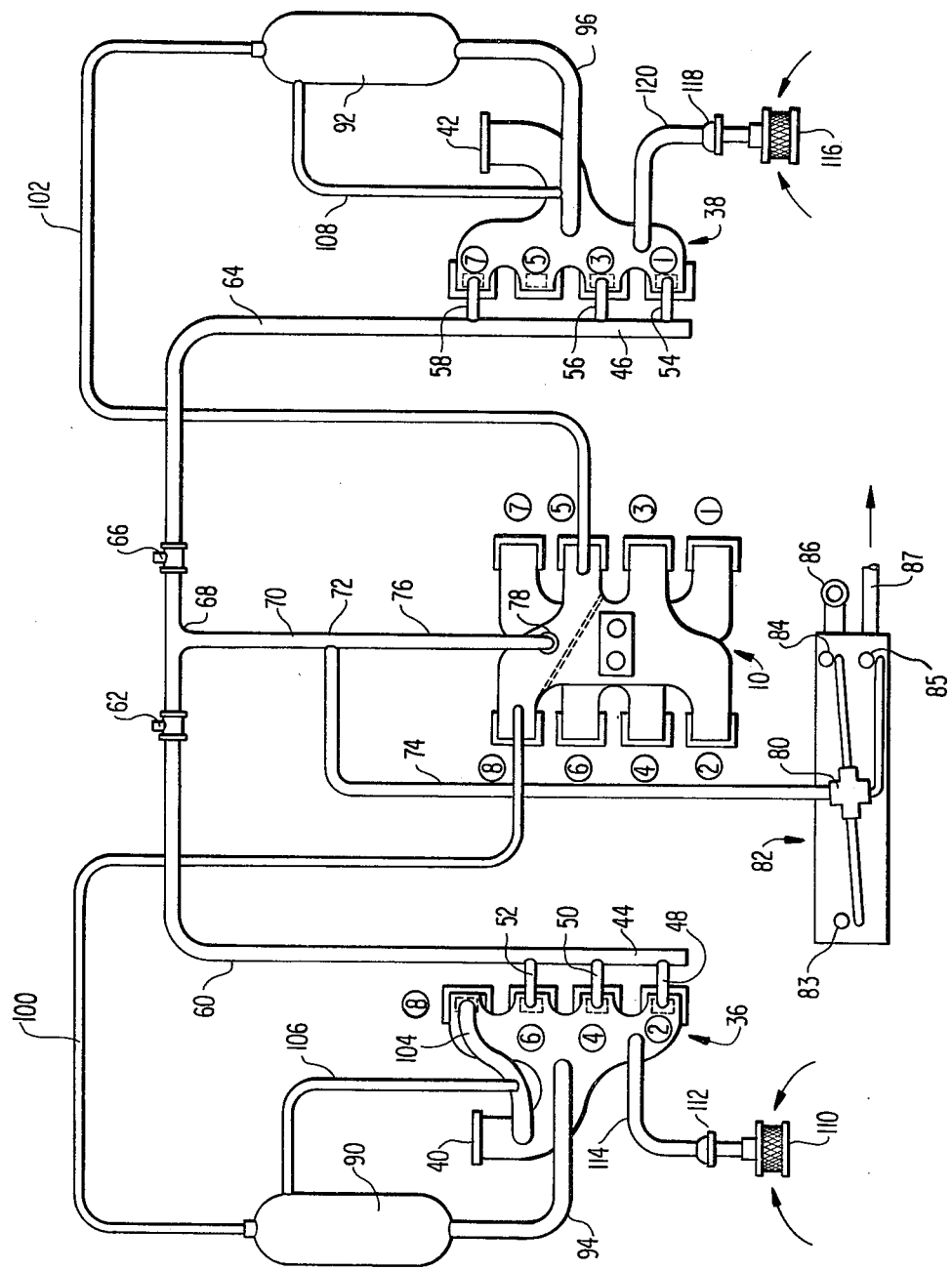
FIG. 1 is a schematic representation of the intake and exhaust manifolds of an internal combustion engine having designated exhaust burning cylinders showing the connection of the air tubes of the primary heat exchanger to the intake manifold for the designated exhaust burning cylinders.

Referring now to FIG. 1 of the drawings, the intake manifold 10 for a V8 internal combustion engine is shown in plan view with the intake ports numbered according to the corresponding cylinder of the engine. The intake manifold 10 is designed to accept a two-barrel carburetor of conventional design, and the cylinders selected to be the designated exhaust burning cylinders are cylinder numbers 5 and 8. The dotted line on the intake manifold indicates that these two cylinders are joined in common with an insolated intake manifold. The exhaust manifold for the right bank of the engine is shown at 36, while the exhaust manifold for the left bank of the engine is shown at 38. The outlets 40 and 42 of the exhaust manifolds 36 and 38, respectively, are connected to an exhaust system (not shown) including an exhaust pipe, muffler and tail pipe combination to vent the exhaust gases collected by the exhaust manifolds 36 and 38 to the atmosphere.

While the exhaust manifolds 36 and 38 collect exhaust gases from the cylinders in common, the exhaust manifolds are modified to collect the combustible gases for supply to the isolated intake manifold for the number 5 and number 8 designated exhaust burning cylinders and to relieve pressures in the exhaust manifold for purposes of creating a generally negative pressure environment. First of all, secondary horizontal exhaust manifolds 44 and 46 are provided for each of the respective exhaust manifolds 36 and 38. The horizontal exhaust manifold 44 is connected by short pieces of pipe 48, 50 and 52 to the pipes leading to the exhaust ports of the numbers 2, 4 and 6 cylinders of the engine. In a similar fashion, the horizontal exhaust manifold 46 is connected by means of short pieces of pipe 54, 56 and 58 to the pipes of exhaust manifold 38 which are connected to the exhaust ports of the numbers 1, 3 and 7 cylinders. The horizontal exhaust manifold 44 is connected by means of a pipe 60 and a control valve 62 to a T fitting 68. The horizontal exhaust manifold 46 is also connected to a pipe 64 and a control valve 66 to this T fitting 68. The T fitting 68 is connected by means of a pipe 70 to a T fitting 72. One of the arms of the T fitting 72 is connected to supply fresh air to the exhaust gases collected by the horizontal exhaust manifolds 44 and 46. More specifically, a pipe 74 is connected to one arm of the T fitting 72. The pipe 74 is connected to a junction 80 of air collection pipes emanating from the primary heat exchanger 82. The fresh air supply enters the heat exchanger 82 through a plurality of air filters 83, 84 and 85. Liquid coolant recirculated by a water pump (shown in FIG. 2) is supplied to primary heat exchanger 82 at inlet 86 located near the top of the heat exchanger, and withdrawn from the primary heat exchanger at outlet 87, located near the bottom of the heat exchanger. In FIG. 1, the heat exchanger 82 is viewed from the top.

The T fitting 72 is connected by means of a pipe 76 to a centrally located input port 78 in the isolated intake manifold for the designated exhaust burning cylinder numbers 5 and 8. The control valves 62 and 66 provide a means for controlling both the volume and ratio of the components in the fuel/air mixture supplied to the designated exhaust burning cylinders.

In the case of an unmodified engine, that is, one without designated exhaust burning cylinders, the pipe 74 would be directly connected connected to supply air to the carburetor, if one is used, or to the air intake manifold, if fuel injectors are used. However, the pressure or vacuum of the carburetor or intake manifold and hence the suction of air through the air pipes in the primary heat exchanger is variable depending on the position of the throttle valve. This necessarily means that the instantaneous heat exchange from the liquid coolant in the reservoir to the air in the pipes is also variable. The advantage of using the modified engine with designated exhaust burning cylinders is that since the air supplied to the intake manifold for the exhaust burning cylinders is unthrottled, air is drawn through the air pipes in the primary heat exchange at a substantially constant rate. Nevertheless, it will be understood that air is constantly drawn through the air pipes when the engine is running whether or not the invention is used with the modified engine or an unmodified engine.

Completing the description of FIG. 1, in addition to the horizontal secondary exhaust manifolds 44 and 46, the exhaust manifolds 36 and 38 are also provided with vertical accumulators 90 and 92, respectively. The accumulators 90 and 92 are positioned so that their longitudinal axes are oriented in a vertical direction and, preferably, the accumulators are both located above their respective exhaust manifolds 36 and 38. The accumulator 90 is connected at its lower end by means of pipe 94 to a central position on the exhaust manifold 36, whereas the accumulator 92 is connected at its lower end by means of a pipe 96 to a central location on the exhaust manifold 38. The upper end of the accumulator 90 is connected by means of a pipe 100 into the isolated intake manifold adjacent to the intake port for the number 8 cylinder. In a similar manner, the upper end of acumulator 92 is connected by means of a pipe 102 into the isolated intake manifold adjacent the intake port for the number 5 cylinder. Thus, the exhaust and air mixture supplied via pipe 76 to port 78 in the isolated intake manifold is supplemented by gases supplied via pipes 100 and 102. For purposes of providing proper pressures within the exhaust manifolds 36 and 38, certain additional modifications are made to these exhaust manifolds. In manifold 36, a balance pipe 104 is connected between the pipe leading to the exhaust port of cylinder number 8 and a position adjacent the outlet 40. A similar pipe, however, is not required for the exhaust manifold 38 because the exhaust port of cylinder number 5, the other designated exhaust burning cylinder, is reasonably proximate to the outlet 42 of the manifold. An air balance line 106 is also connected near the top of the accumulator 90 and to the balance pipe 104, and a similar air balance line 108 is connected near the top of the accumulator 92 and to a point on the exhaust manifold 38 below the connection thereto of pipe 96. The exhaust manifolds 36 and 38 are also provided with fresh air supply sources. More specifically, exhaust manifold 36 is provided with the series connection of air filter 110, a check valve 112 and a connecting pipe 114 which communicates with the exhaust manifold 36 at a point which is relatively remote from the exhaust port of designated exhaust burning cylinder number 8. The exhaust manifold 38 is also provided with a series combination of an air filter 116, a check valve 118 and connecting pipe 120 which communicates with the manifold at a point which is relatively remote to the exhaust port of the designated exhaust burning cylinder number 5.

As is described in my U.S. Pat. No. 4,068,628, additional improvements in the operation of the internal combustion engine having designated exhaust burning cylinders can be realized by venting the crankcase and fuel supply tank into the isolated intake manifold for the designated exhaust burning cylinders. The present invention further enhances those advantages by providing a secondary or auxiliary heat exchanger which uses the volatility of the fuel as a means for cooling the liquid coolant which is recirculated in the engine block. As will be understood from the following discussion, the heat transfer which takes place with the use of the secondary heat exchanger promotes the production of fuel vapors which are supplied to the designated exhaust burning cylinders.

Figure 2:
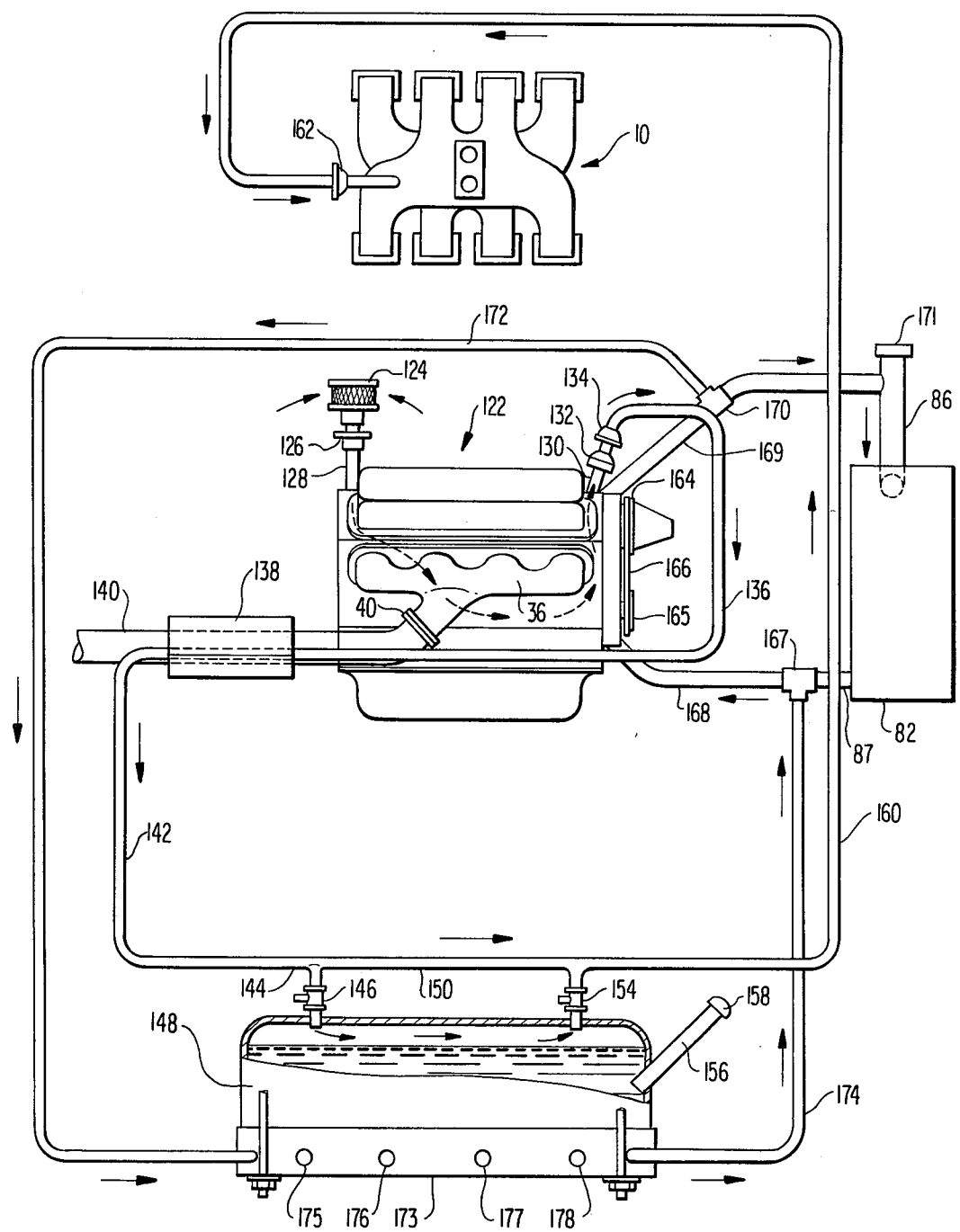
FIG. 2 is a schematic representation showing the liquid coolant connections for both the primary and secondary heat exchangers with an internal combustion engine having designated exhaust burning cylinders.

Now with particular reference to FIG. 2, a right side view of a V8 engine is represented at 122. The right exhaust manifold 36 is shown, but the horizontal exhaust manifold 44 and the vertical accumulator 90 have been omitted from this figure for purposes of clarity. Also omitted from the figure is the connections for the air supply from the primary heat exchanger 82 to the isolated intake manifold. This figure has for its purpose the illustration of the liquid coolant and fuel vapor connections to the internal combustion engine.

Fresh air is vented through the air filter 124, check valve 126 and short connecting pipe 128 through an opening in the rear of the valve compartment cover plate which normally serves as a road draft exit of crankcase vapors. The dotted arrows represent the circulation of crankcase vapors through the engine. These vapors flow out of the oil filler pipe 130 which is provided on the engine in stock condition. However, in place of the conventional breather cap normally provided on the oil filler pipe 130, a special fitting 132 having an outlfow check valve 134 connected thereto is provided. The fitting 132 makes a sealed connection to the oil filler pipe 130, but is adaptable for instant removal for oil replenishment.

The outflow check valve 134 is connected by means of pipe 136 to a heat exchanger 138. The heat exchanger 138 may be of any conventional design and may be mounted on the exhaust pipe 140 which is connected to the outlet 40 of the exhaust manifold 36. The purpose of the heat exchanger 138 is to heat the crankcase vapors passing through the outflow check valve 134.

The heated crankcase vapors from the output of heat exchanger 138 are conducted by means of a pipe 142 to a T fitting 144. This T fitting 144 is connected by means of a variable position flow valve 146 to one end of the fuel supply tank 148. The T fitting 144 is also connected by means of a pipe 150 to a second T fitting 152. The T fitting 152 is connected by means of a second variable position flow valve 154 to another end of the fuel supply tank 148 remote from the valve 146. The variable position valves 146 and 154 are used for adjusting the amount of vapors flowing into and out of the fuel supply tank as required for smooth running of the engine. The fuel supply tank is provided with a filler pipe 156 and is conventional, and the filler pipe 156 is provided with a non-vented filler cap 158. The T fitting 152 is connected by means of a pipe 160 through an outflow check valve 162 to the isolated intake manifold which is a part of the intake manifold 10.

The engine 122 is supplied with a conventional water pump generally indicated at 163 having a drive pulley 164 coupled to a crankshaft pulley 165 by means of a V-belt 166. While the water pump and drive pulley arrangement is conventional, no fan is used.

Liquid coolant from the primary heat exchanger 82 is supplied via the outlet 87 to a T fitting 167 and pipe 168 to the inlet of the water pump 163. After the liquid coolant has circulated through the block of the engine 122, it is returned to the primary heat exchanger 82 by means of a pipe 169 and T fitting 170 connected to the inlet 86. The inlet 86 may also be supplied with a pressure release cap 171 purposes of replenishment of liquid coolant in the cooling system.

A pipe 172 connected to the T fitting 170 supplies liquid coolant to the secondary heat exchanger 173. Liquid coolant from the heat exchanger 173 is returned by means of pipe 174 to T fitting 167. Heat exchanger 173 is bolted or otherwise attached to the bottom of the fuel tank 148 so as to have substantial surface contact therewith. The hot liquid coolant from the engine block passes through the heat exchanger 173 and heats the fuel in the fuel tank 148. The heat exchange that takes place results in a cooling of the liquid coolant which is returned to the inlet pipe 168 to the water pump 163. The heat exchange is promoted by the substantial surface contact between the heat exchanger 173 and the fuel tank 148 and the low vapor pressure of the fuel. As the fuel is heated, fuel vapors are produced which are supplied via the pipe 160 and valve 162 to the isolated intake manifold for the exhaust burning cylinders.

In addition to the heat transfer between the secondary heat exchanger 173 and the fuel in fuel tank 148, cooling of the liquid coolant passing through the heat exchanger 173 can be further enhanced by the provision of air tubes which pass entirely through the heat exchanger from one edge to the opposite edge. The inlets for four such tubes 175, 176, 177 and 178 are shown in the drawing. These inlets are positioned to receive an airflow due to the forward motion of the vehicle.

Turning now to FIGS. 3A and 3B, the primary heat exchanger 82 is shown in more detail. This heat exchanger has two primary components. These are an aluminum tank 180 which forms a reservoir for liquid coolant and three sets of copper coils 181, 182 and 183 located within the liquid coolant reservoir. In FIG. 3A, the tank 180 is shown partially broken away to expose the three sets of coils 181, 182 and 183. These coils are preferably provided with aluminum fins to further enhance heat transfer from the liquid coolant to air passing through the copper coils. The air inlet to the copper coils 181 is provided through the air filter 84 which is attached to a short piece of the copper tubing projecting through the top cover 184 of the tank 180. The outlet for the coils 181 also projects through the top cover plate 184 and is connected by means of a pipe 185 to junction 80 connected to pipe 74 which supplies air to the isolated intake manifold for the designated exhaust burning cylinders. In similar fashion, fresh air is supplied to the coils 182 and 183 through air filters 83 and 84, respectively, and air from these coils is conducted by pipes 187 and 188 to junction 80.

The three sets of copper coils 181, 182 and 183 are mechanically supported by a frame assembly 189 which is attached to the underside of the top cover plate 184. Thus, removal of the top cover plate 184 also removes the coils 181, 182 and 183. A temperature gauge 190 may be conveniently located anywhere on the tank 180, or, alternatively, temperature sensing units may be located within the liquid coolant reservoir and connected to remote temperature indicators.

FIG. 3B shows in more detail the connections of the liquid coolant lines for the primary heat exchanger to the engine and to the secondary heat exchanger attached to the fuel tank. As shown in this figure, a filler pipe 191 separate from the inlet supply pipe 86 may be provided. This filler pipe is connected to the case 180 of the tank and closed with the pressure release cap 171. In order to assure complete filling of the liquid coolant reservoir, a short air vent line 192 is connected between the filler pipe 191 and the top cover plate 184. The filler pipe 191 is further provided with a short relief pipe 193 just under the pressure relief cap 171, as is conventional.

Figure 4A:
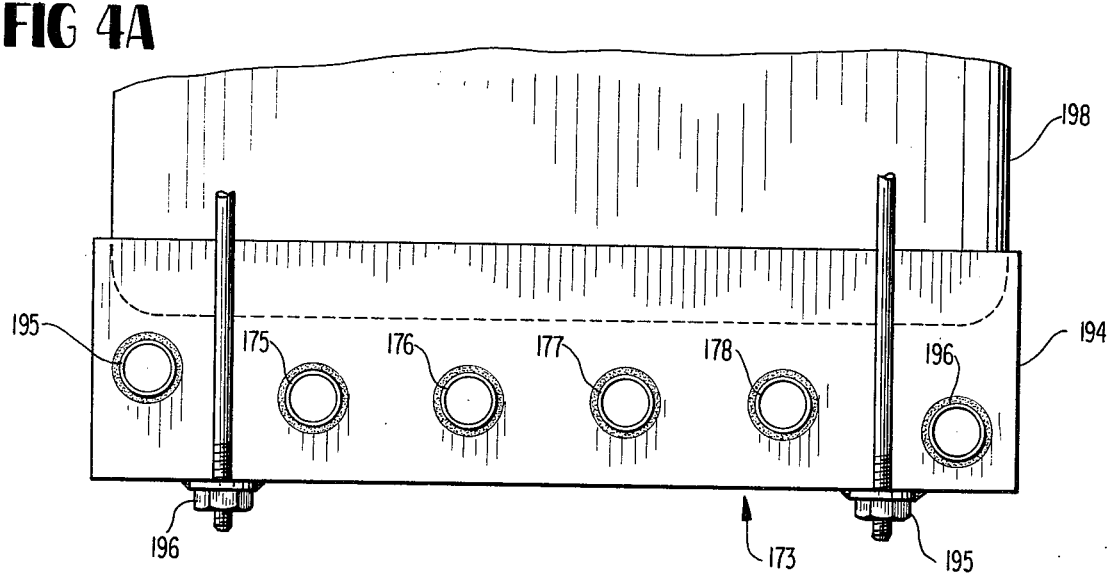
FIGS. 4A and 4B are respectively an end view and a plan view of the secondary heat exchanger.
Figure 4B:
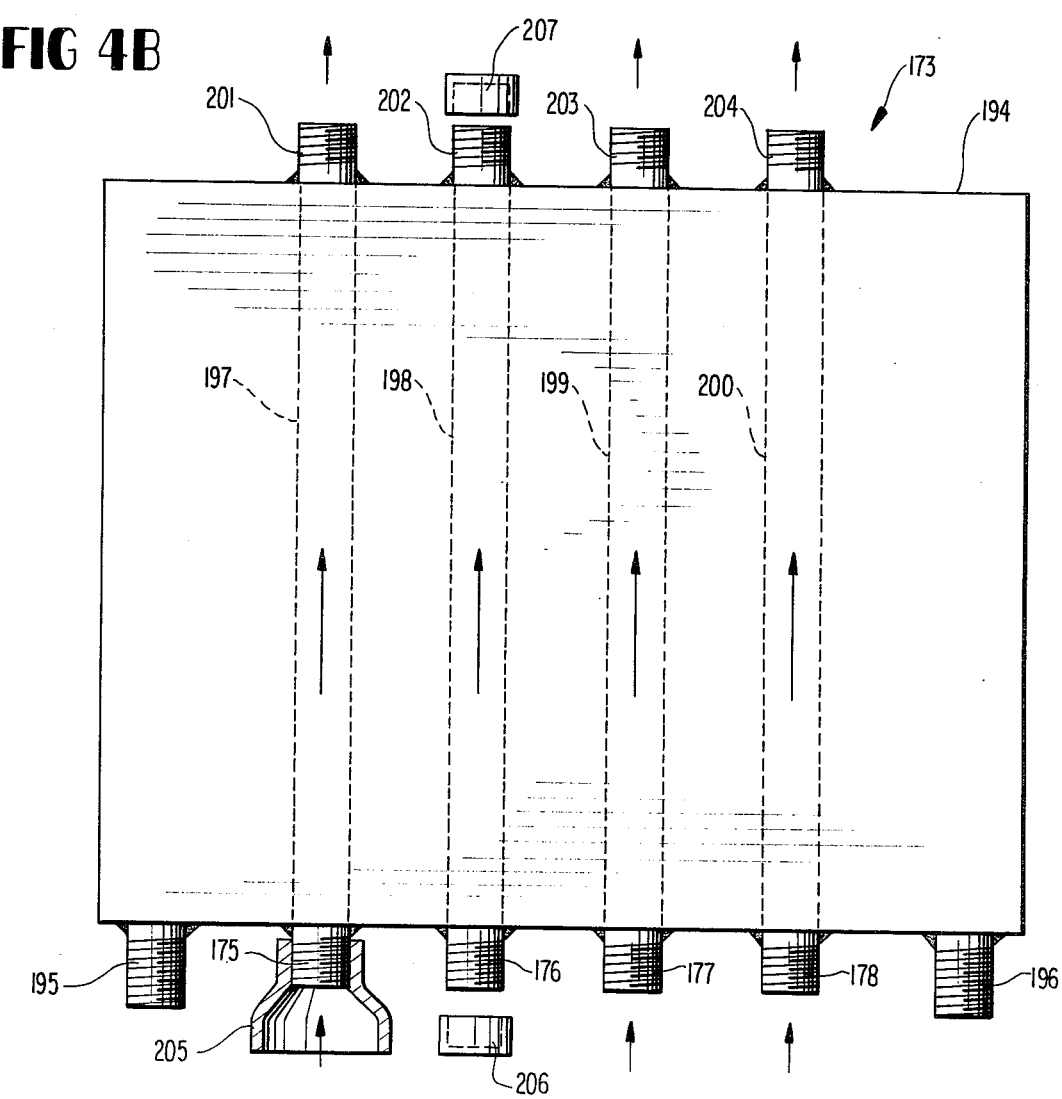

The details of the construction of the secondary heat exchanger are shown in FIGS. 4A and 4B. This heat exchanger 173 comprises a generally flat plate coolant tank 194 attached to the fuel supply tank by means of bolts 195 and 196 or other suitable means of attachment. While having a generally flat configuration, the liquid coolant tank 194 is constructed to conform to the surface contour of the fuel supply tank, thereby providing an intimate and substantially surface contact between the liquid coolant tank 194 and fuel supply tank 148.

Liquid coolant is supplied to the tank 194 by means of inlet 195 which is connected to the pipe 172. After passing through the tank 194, the liquid coolant is drawn out of the tank at outlet 196 which is connected to pipe 174. In this manner, liquid coolant from the engine 122 is recirculated through the secondary heat exchanger 173 which is connected in parallel with the primary heat exchanger 82.

To further enhance the cooling of the heated liquid coolant from the engine 122, the tank 194 is provided with air tubes 197, 198, 199 and 200 which pass completely through the tank and are, therefore, in contact with the liquid coolant. The inlets 175, 176, 177 and 178 of these air tubes are sealed at the front of the tank by welding or other suitable means, and the outlets 201, 202, 203 and 204 are similarly sealed at the back of the tank 194. If desired, the tubes 197, 198, 199 and 200 can be provided with fin structures to further enhance the heat transfer between the heated liquid coolant and the air flowing through the separate air tubes. As represented by the single air scoop 205 attached to the inlet 175 of tube 197, air scoops can be provided for each of the inlets if needed for increased airflow through the air tubes. These air scoops can be detachably connected to the inlets by means of threaded fittings, for example. Alternatively, inlet caps, as represented by inlet cap 206, and outlet caps, as represented by outlet cap 207, can be used to close off one or more or all of the air tubes, thereby restricting the airflow and increasing the temperature of the liquid coolant at the outlet 196. The use of air scoops 205 and inlet and outlet caps 206 and 207, respectively, are optional depending on ambient temperatures.

The sizes of the tank 180 for the primary heat exchanger and the tank 194 for the secondary heat exchanger depend on various factors, including the cooling requirements for the engine 122 and the space available for the heat exchangers. However, for a V8 automotive engine, a tank 180 for the primary heat exchanger having a capacity of approximately 5¼ gallons of liquid coolant and a tank 194 for the secondary heat exchanger having a capacity of approximately 2½ gallons of liquid coolant has been found adequate. It will be appreciated, however, that this capacity can be realized in multiple tanks rather than the two tanks specifically disclosed and described herein. For example, the primary heat exchanger may, in fact, be composed of two or three tanks, each comprising one or more sets of coils. This, of course, permits the possibility that these smaller tanks can be located in various places within the vehicle body which would be otherwise wasted. In like manner, the secondary heat exchanger tank 194 could comprise two tanks located on either side of the fuel tank, particularly if the fuel tank is positioned vertically. Moreover, the tank 194 for the secondary heat exchanger may even comprise a jacket which completely encloses the fuel tank. This would have the additional advantage of protecting the fuel tank from rupture in case of a collision.

What is claimed is:

1. A cooling system for a multi-cylinder internal combustion engine having designated exhaust cylinders which burn the exhaust gases which are expelled from fuel burning cylinders, a separate intake manifold being provided for said exhaust burning cylinders, said engine having a liquid coolant pump for circulating liquid coolant through the engine block, said cooling system including a primary heat exchanger comprising a closed tank defining a reservoir for the liquid coolant, said tank being connected to supply liquid coolant to said liquid coolant pump and to receive liquid coolant from said engine block after circulation therethrough, and at least one set of coiled tubing positioned within said closed tank and immersed in liquid coolant contained therein, said coiled tubing having first and second ends, said first end communicating with ambient air, and said second end being connected to said separate intake manifold for said exhaust burning cylinders whereby the vacuum created in said separate intake manifold when said engine is running produces a suction, causing air to constantly flow through said coiled tubing, thereby cooling the liquid coolant within said closed tank.

2. A cooling system as recited in claim 1 wherein a fuel tank is provided for supplying fuel to the engine, said cooling system further including a secondary heat exchanger comprising a generally flat plate tank conforming to the contour of at least one surface of said fuel tank and being attached thereto with substantial intimate surface contact therewith, said plate tank being connected to supply liquid coolant to said liquid coolant pump and to receive liquid coolant from said engine block after circulation therethrough, whereby heat from said liquid coolant is transferred to the fuel in said fuel tank.

3. A cooling system as recited in claim 2 further comprising a plurality of air tubes which pass entirely through said generally flat plate tank of said secondary heat exchanger.

4. A cooling system for an internal combustion engine as recited in claim 1 wherein said closed tank is provided with a detachable top cover plate, a frame is attached to the underside of said detachable top cover plate for supporting said coiled tubing, said first and second ends of said coiled tubing projecting through said top cover plate.

5. A cooling system as recited in claim 1 wherein a fuel tank is provided for supplying fuel to the engine, said cooling system further including a secondary heat exchanger comprising a generally flat plate tank conforming to the contour of at least one surface of said fuel tank and being attached thereto with substantial intimate surface contact therewith, said plate tank being connected to supply liquid coolant to said liquid coolant pump and to receive liquid coolant from said engine block after circulation therethrough, whereby heat from said liquid coolant is transferred to the fuel in said tank.

6. A cooling system as recited in claim 5 further comprising a plurality of air tubes which pass entirely through said generally flat plate tank of said secondary heat exchanger.

* * * * *